United States Patent [19]

Oudyn et al.

[11] Patent Number: 5,424,637
[45] Date of Patent: Jun. 13, 1995

[54] METHOD AND APPARATUS FOR DETERMINING THE POSITION OF AN ARMATURE IN AN ELECTROMAGNETIC ACTUATOR USING OBSERVER THEORY

[75] Inventors: Michael K. Oudyn, Peoria; Juraj Medanic, Champaign, both of Ill.

[73] Assignee: Caterpillar Inc., Peoria, Ill.

[21] Appl. No.: 48,497

[22] Filed: Mar. 15, 1993

[51] Int. Cl.⁶ ............................................. G01B 7/14
[52] U.S. Cl. .......................... 324/207.16; 324/207.24
[58] Field of Search ............... 324/207.16, 654, 207.12, 324/207.13, 207.22, 207.24, 207.26, 226, 262; 318/687

[56] References Cited

U.S. PATENT DOCUMENTS

| | | | |
|---|---|---|---|
| 3,789,876 | 2/1974 | Kempton et al. | 137/554 |
| 4,074,185 | 4/1978 | Dardenne | 324/654 |
| 4,216,795 | 8/1980 | Cobb et al. | 137/554 |
| 4,321,946 | 3/1982 | Paulos et al. | 137/554 |
| 4,618,808 | 10/1986 | Ish-Shalom et al. | 318/696 |
| 4,692,678 | 9/1987 | Lee | 318/687 |
| 4,770,841 | 9/1988 | Haley et al. | 376/216 |

FOREIGN PATENT DOCUMENTS

0400389A2 12/1990 European Pat. Off.
63-13307 1/1988 Japan.

OTHER PUBLICATIONS

Article: "A State Observer For Variable Reluctance Motors", By: A. Lumsdaine, J. H. Lang, and M. J. Balas, (Department of Electrical Engineering and Computer Science Laboratory For Electromagnetic and Electronic Systems Massachusetts Institute of Technology, Cambridge, Mass. 02139) before 1992.

Article: "A State Observer For the Permanent-Magnet Synchronous Motor", By: L. A. Jones et al., (Department of Electrical Engineering and Electronic Systems, Massachusetts Institute of Technology, Cambridge, Mass., IECON '87.

Proceedings 39th Relay Conference, Apr. 22-24, 1991, Stillwater, Okla., "An Unconventional Approach To Solenoid Position Detection", By: D. Castle et al., Northern Illinois University, Engineering School, Dekalb, Ill.

SAE Technical Paper Series, "Linear Position Control Using Simple Solenoids and an Electromagnet", By: D. V. Bitner et al., International Off-Highway & Powerplant Congress and Exposition, Milwaukee, Wisconsin, Sep. 10-13, 1990.

"Feedback Control of Dynamics of Dynamics Systems", By: Gene F. Franklin, 1987, Addison-Wesley Publishing Co.

*Primary Examiner*—Walter E. Snow
*Attorney, Agent, or Firm*—David M. Masterson

[57] ABSTRACT

Electromagnetic actuators that include a coil and an armature are used in a number of applications. It is desirable to determine the position of the armature with respect to the coil without the use of external sensors. Accordingly, an apparatus is provided that determines the position of the armature with respect to the coil in response to the coil current and voltage.

7 Claims, 5 Drawing Sheets

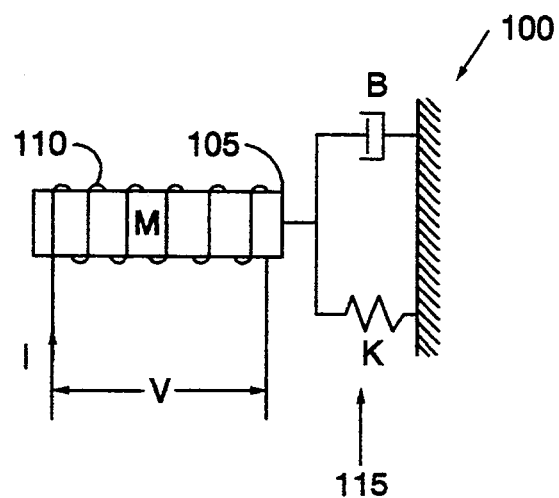
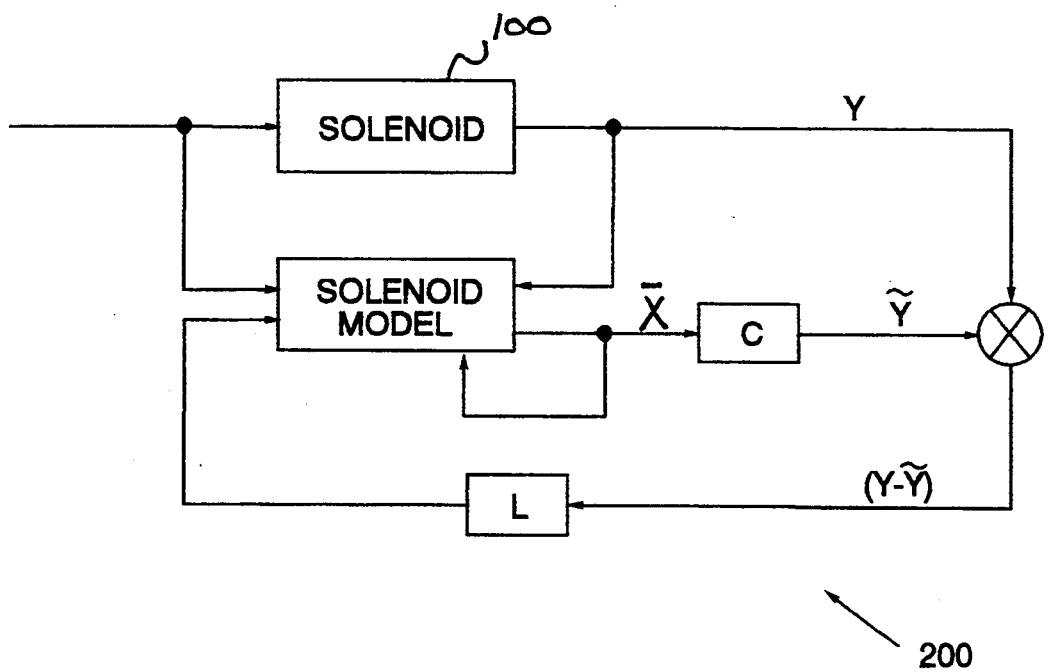

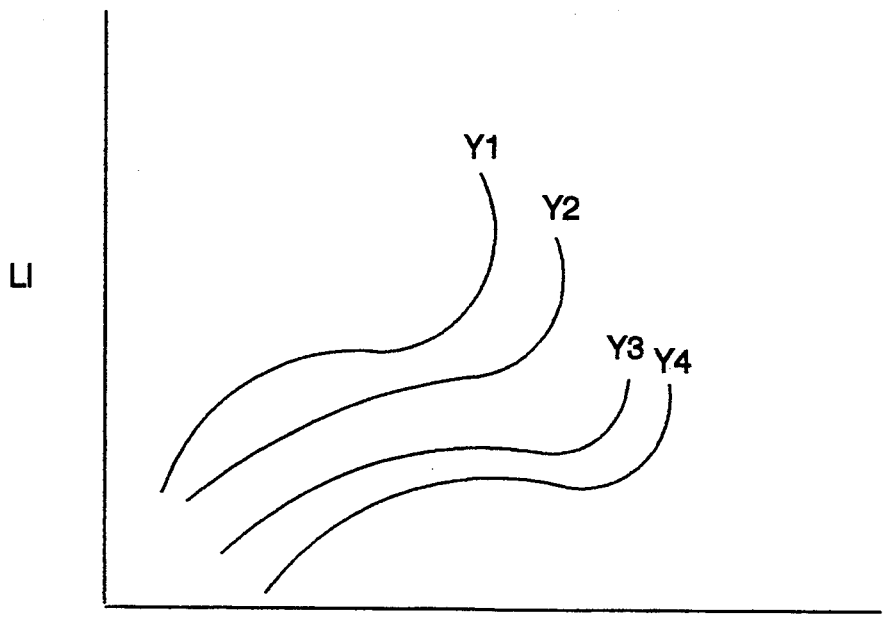
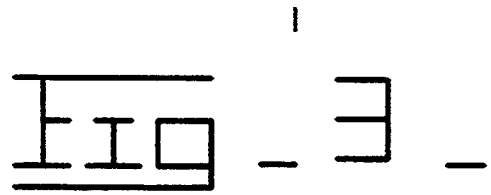
Fig_3_
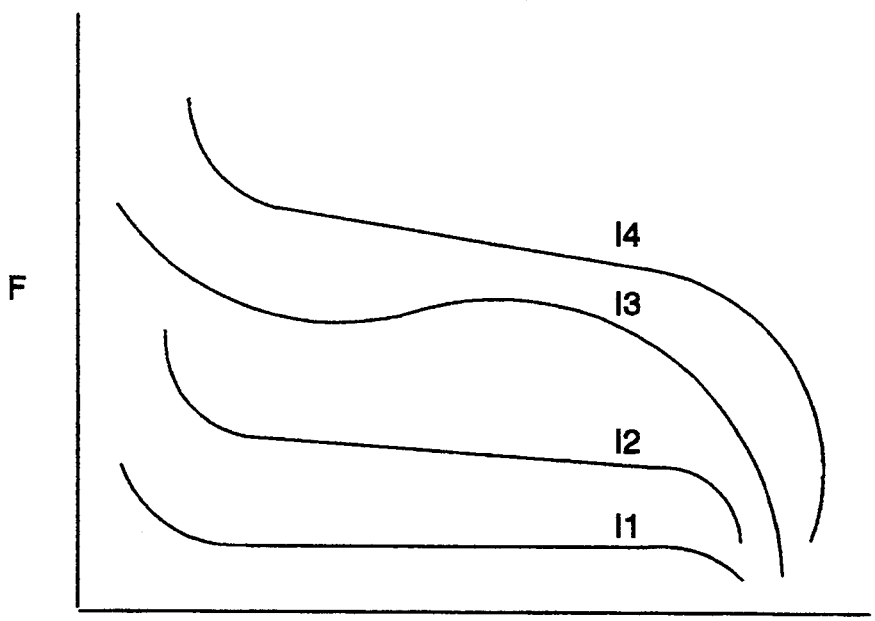
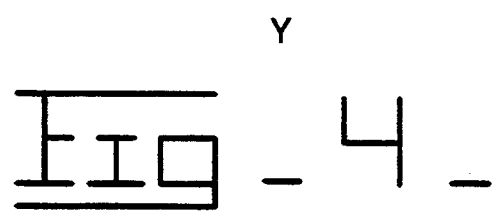
Fig_4_

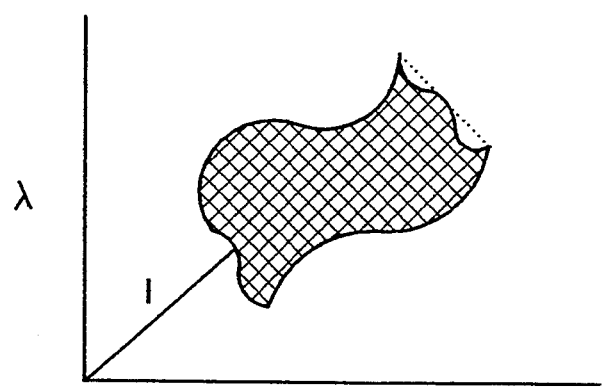
Fig_5_
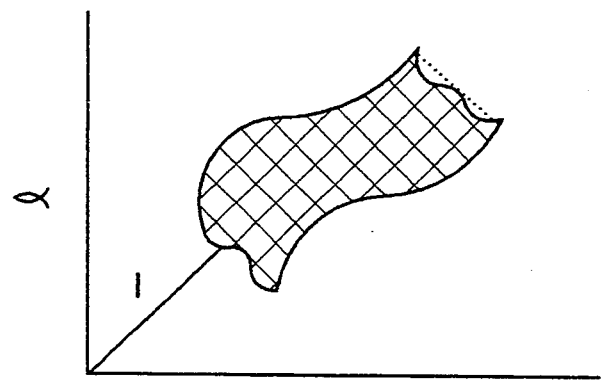
Fig_6_
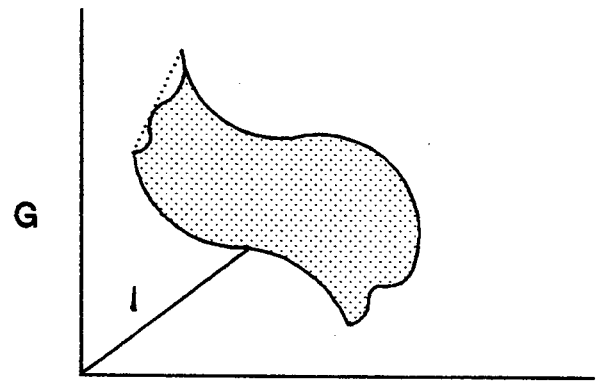
Fig_7_

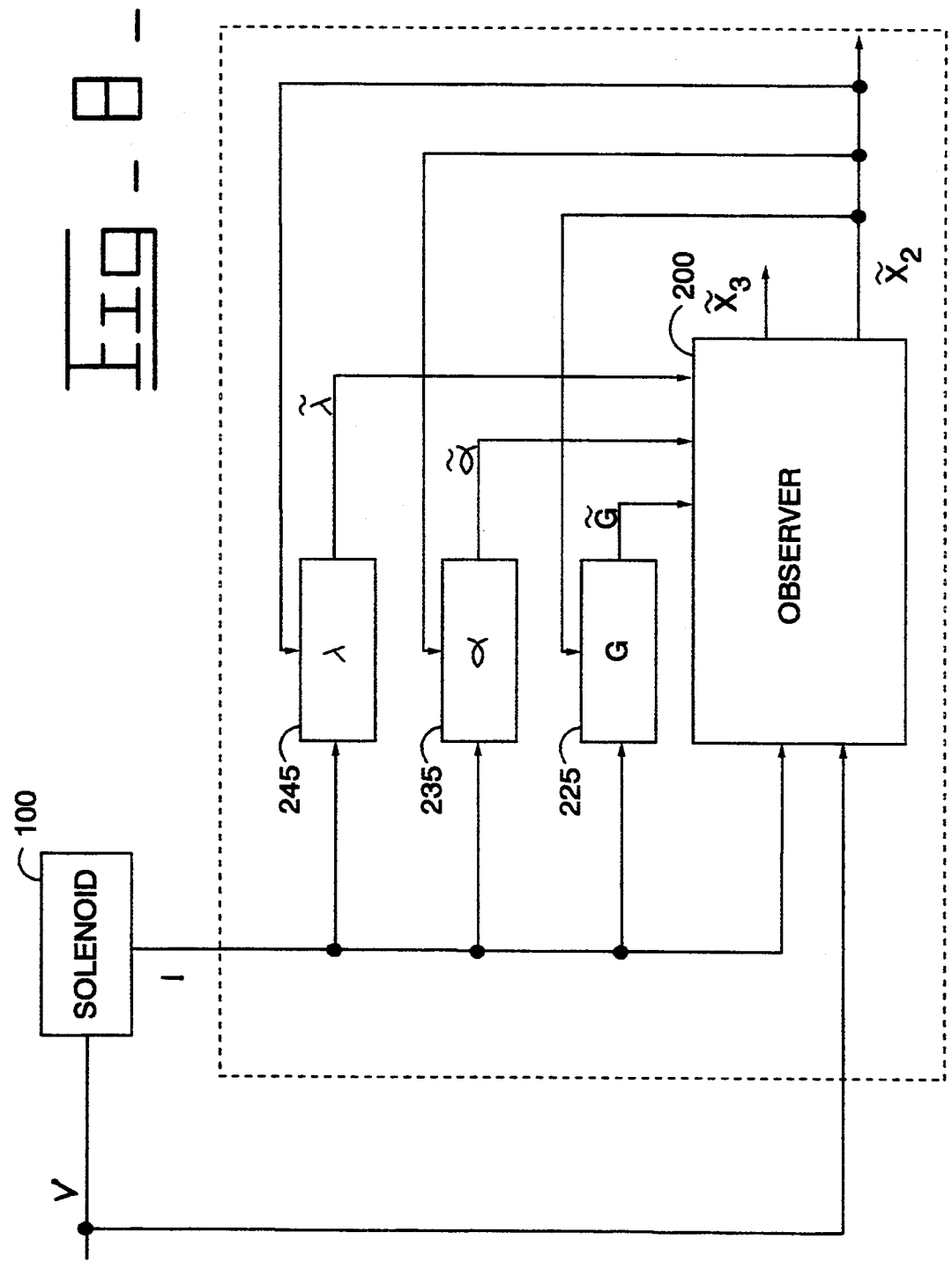

METHOD AND APPARATUS FOR DETERMINING THE POSITION OF AN ARMATURE IN AN ELECTROMAGNETIC ACTUATOR USING OBSERVER THEORY

TECHNICAL FIELD

This invention relates generally to a method and apparatus for determining the position of an armature of an electromagnetic actuator, and more particularly, to a method and apparatus for estimating the position of an armature of an electromagnetic actuator using observer theory.

BACKGROUND ART

Electromagnetic actuators, such as linear or rotary solenoids, typically include a coil in electromagnetic communication with a movable armature. The coil is generally connected to a controllable driving circuit which varies the magnitude of current flowing in the coil and resultantly varies the strength of the magnetic field being produced by the coil. As the strength of the magnetic field is changed, the armature moves in response to the resulting change in the magnetic force being exerted on the armature.

Typically, the position of the armature is a function of both the magnitude of current flowing in the coil and the magnitude and direction of mechanical forces being exerted on the armature. The mechanical forces are exerted on the armature in response to the operating conditions of the system in which the electromagnetic actuator is operating. It is therefore advantageous to have a method of determining the position of the armature so that the operating conditions of the system can be indicated and used in connection with system diagnostics or a closed-loop control for the driving circuit.

The most common method of determining the position of the armature of an electromagnetic actuator is to connect an external sensor to the actuator. Such sensors often take the form of potentiometers or linear voltage differential transformers (LVDTs). While the addition of these sensors provides the desired information, they increase the cost and warehousing requirements of the actuator.

Attempts to provide position information without utilizing additional sensors have generally taken the form described in Japanese Patent Appl. No. 61-157418, published Jan. 20, 1988, and in *Proceedings: 39th Relay Conference*, Apr. 22-24, 1991, National Association of Relay Manufacturers, pp. 9-1 through 9-4. Both of the above publications disclose systems which determine the position of the armature by measuring the inductance of the coil in the actuator. Since inductance is a function of the air gap between the armature and the coil, the size of the air gap, and hence armature position, is determined by comparing measured inductance values to empirically determined inductance versus position characteristics. Systems of this type may provide inaccurate positional information for actuators that exhibit second-order characteristics since the electromagnetic flux varies, which in turn, effects the inductance values. Furthermore, as described in the Japanese Application, additional measurements and comparisons, e.g. coil temperature and magnetomotive force, are required to provide accurate indications of armature position.

DISCLOSURE OF THE INVENTION

In one aspect of the present invention, an apparatus for estimating the position of an armature of an electromagnetic actuator is disclosed. The apparatus includes a circuit for measuring the magnitude of current in the coil and responsively producing a current signal. Another circuit for measuring the magnitude of the voltage across the coil and responsively producing a voltage signal. A microprocessor for receiving the current and voltage signals, and responsively estimating predetermined state variables of the electromagnetic actuator by using observer theory.

BRIEF DESCRIPTION OF THE DRAWING

For a better understanding of the present invention, reference may be made to the accompanying drawings, in which:

FIG. 1 shows a diagrammatic model of a solenoid;

FIG. 2 shows a block diagram of a solenoid observer model associated with the present invention;

FIG. 3 shows a graphical representation of the relationship between flux linkage, coil current, and armature position;

FIG. 4 shows a graphical representation of the relationship between the electromechanical force, coil current, and armature position;

FIGS. 5, 6, 7 shows maps representing $\lambda$, $\alpha$ and G, respectively, as a function of coil current and estimated position;

FIG. 8 shows a block diagram of the solenoid observer model with the $\lambda$, $\alpha$ and G maps, associated with an embodiment of the present invention.

BEST MODE FOR CARRYING OUT THE INVENTION

Figure 9:
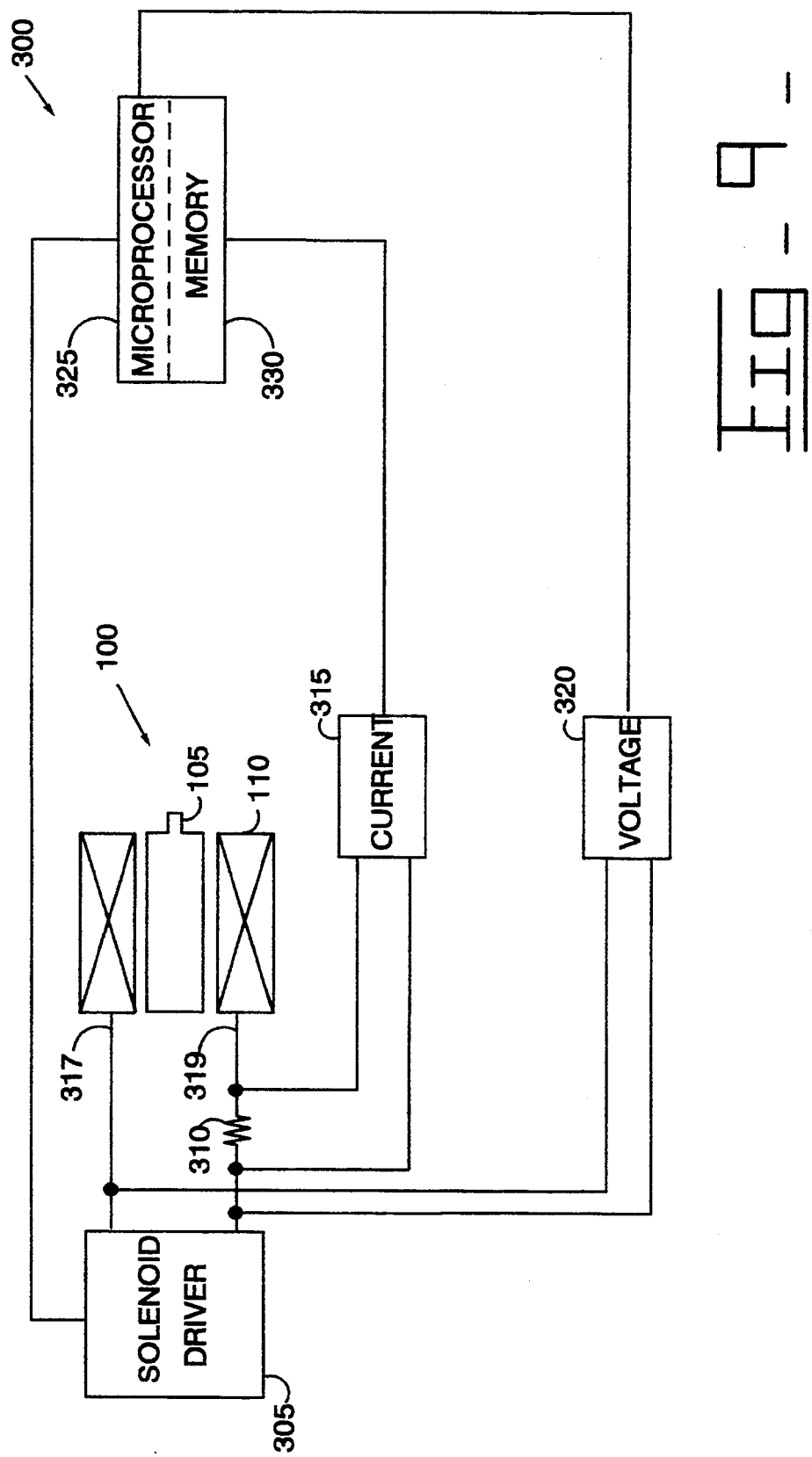
FIG. 9 shows a block diagram of a control system associated with an embodiment of the present invention.

Referring to FIG. 1, an electromechanical model of an electromagnetic actuator 100, e.g. a solenoid, is shown. The electromagnetic actuator 100 includes a moveable armature 105 and an electromagnetic coil 110. The coil 110, upon being energized, produces an electromagnetic force that causes the armature 105 to move relative to the coil 110. A spring 115 is provided to restore the armature 105 to a neutral position in response to the coil 110 being deenergized. The electrical portion of the model may be described by Kirchoff's voltage law and is defined by the following equation:

$$V - IR = \frac{\partial \psi}{\partial I} \frac{\partial I}{\partial t} + \frac{\partial \psi}{\partial y} \frac{\partial y}{\partial t} \tag{1}$$

where

V is the magnitude of voltage applied to the solenoid;
I is the magnitude of current in the solenoid coil;
R is the resistance of the coil;
L is the inductance of the coil; and
$\psi = LI$, the flux linkage.

The mechanical portion of the model may be described by Newton's law and is defined by the following equation:

$$F = M \frac{\partial^2 y}{\partial t^2} + B \frac{\partial y}{\partial t} + Ky \tag{2}$$

where,

F is the electromechanical force;
y is the linear position of the armature;
M is armature mass;
B is the friction force coefficient; and
K is the spring stiffness.

The electromechanical force is related to the current by the following relationship:

$$F = GI + off \quad (3)$$

where,
G, offset are the coupling parameters relating F and I.

The present invention is directed toward determining the position and velocity of the armature 105 without the use of an external sensor. Advantageously, the present invention utilizes observer or estimator theory to estimate the armature position and velocity using a programmable microprocessor. For a detailed discussion on estimator design, the reader is referred to a textbook titled *Feedback Control of Dynamic Systems* by Gene F. Franklin, which is published by Addison-Wesley Publishing Co.

A block diagram of an observer model 200 is shown in FIG. 2. In general the governing equation for the observer model 200 is:

$$\tilde{X} = A\tilde{X} + BU + L(Y - C\tilde{X}) \quad (4)$$

where
$\tilde{X}$ is the state estimate;
U is the input state, e.g. the voltage applied to the solenoid;
Y is the available output states, e.g. the current in the coil;
A is the state matrix;
B is the input matrix;
C is the output matrix; and
L is the gain matrix.
Let
$x_1 = I$ (current);
$x_2 = y$ (position);

$$x_3 = \frac{\partial y}{\partial t} \text{ (velocity)};$$

$\lambda = \partial \psi / \partial I$; and
$\alpha = \partial \psi / \partial y$.

Thus, the solenoid model described in equations 1–3 can be represented in state space form as:

$$\tilde{x}_1 = \frac{V - R\tilde{x}_1 - \alpha(\tilde{x}_1, \tilde{x}_2)\tilde{x}_3}{\lambda(\tilde{x}_1, \tilde{x}_2)} + L_1(x_1 - \tilde{x}_1) \quad (5)$$

$$\tilde{x}_2 = \tilde{x}_3 + L_2(\tilde{x}_1 - \tilde{x}_1) \quad (6)$$

$$\tilde{x}_3 = \frac{G}{M}\tilde{x}_1 + \frac{off}{M} - \frac{K}{M}\tilde{x}_2 - \frac{B}{M}\tilde{x}_3 + L_3(\tilde{x}_1 - \tilde{x}_1) \quad (7)$$

Those skilled in the art will recognize that the above constants are representative of empirical data that is based on the particular solenoid dynamics. The gain values $L_1$, $L_2$, $L_3$ are chosen to produce the desired dynamics of the observer model. Finally, the value of the friction force coefficient B may be determined as shown below.

The second order mechanical system is shown by:

$$s^2 + 2\zeta\omega_n s + \omega_n^2 = s^2 + \frac{B}{M}s + \frac{K}{M}$$

where $\omega_n$ is the natural frequency of the system and $\zeta$ is the damping ratio. This results in $$2\zeta\omega_n = \frac{B}{M}$$

As is well known solenoids have nonlinear magnetic characteristics, i.e. the magnetic flux changes with armature position and coil current. For example, the terms $\lambda$ and $\alpha$, which represent the inductance, and back electromotive force, respectively, are a function of the magnetic flux. Thus, the values of $\lambda$ and $\alpha$ are responsive to the armature position and coil current. Additionally, the term G, which represents the electromagnetic coupling is also responsive to the armature position and coil current. The values of $\lambda$, $\alpha$ and G may be determined in software using look-up tables or mathematical equations.

For example, a family of flux curves for different armature positions are shown in FIG. 3 and a family of force curves for different coil current values are shown in FIG. 4. The data that represents the curves may be determined by well known empirical methods. The data points of each curves shown in FIG. 3 may be used to derive a map for the inductance term, $\lambda$ and the back EMF term, $\alpha$—shown in FIGS. 5 and 6. Therefore, the values of $\lambda$ and $\alpha$ may be determined by storing empirically determined data that represents the family of curves illustrated in FIG. 3. The stored data is compared to a measured magnitude of the coil current and an estimated value of the armature position. In the preferred embodiment, a three-dimensional look-up table of a type well-known in the art is used to represent the maps of $\lambda$ and $\alpha$.

Similarly, the data points of each curve shown in FIG. 4 may be used to derive a map for the electromagnetic coupling term, G, shown in FIG. 7. Preferably a three-dimensional look-up table is also used to represent the map of G.

Shown in FIG. 8 is a block diagram of the observer 200 with respect to the solenoid 100. The maps of $\lambda$, $\alpha$ and G are represented by the respective blocks 225, 235, 245. The dashed line encompassing the observer 200 represents the microprocessor.

Another method to determine the values of $\lambda$, $\alpha$ and G is to program the microprocessor to calculate the values using mathematical equations. As is apparent to those skilled in the art, the family of curves shown in FIG. 3 may be represented by equations using well known curve-fitting techniques. Based on the curve-fit equations, $\lambda$ and $\alpha$ may be defined by the following:

$$\lambda = A(y+C)^{\frac{1}{2}}(Q+I)e^{-(Q+I)n}$$

$$\lambda = A(y + C)^{1/2}(Q + I)e^{-(Q+I)n}$$

$$\alpha = \frac{A}{2n^2(y + C)}\{e^{-Qn}(Qn + 1) - e^{-(Q+I)n}((Q + I)n + 1)\}$$

where A, C, Q and n are constants and are chosen to fit the empirically derived data curves.

The curve-fit equation representing G may be obtained by conventional curve-fitting techniques using the relationship:

$$G = dF/dI$$

As discussed above, the preferred embodiment of the observer model is implemented as a software program for use in a microprocessor. Thus the continuous equations representing the observer (eqs. 5-7) should be discretized. The discretized equations may be implemented directly into the computer software. Several mathematical techniques may be used to discretize the continuous equations, two of which will be described here—Forward Euler Integration and Runge-Kutta Integration.

Forward Euler Integration

The simple Euler technique employs a first order Taylor approximation of the derivative as follows.

$$y_1 = \frac{y_{i+1} - y_i}{h}$$

where h is the "time step" or "loop time" of the microprocessor. The truncation error is of the order of $h^2$. With this approximation, the 3rd order observer equations become $$z_1(t+h) = z_1(t) + h\left(\frac{V(t) - Rz_1(t) - \alpha(z_1, z_2)z_3(t)}{\lambda(z_1, z_2)}\right)$$

$$z_2(t+h) = z_2(t) + hz_3(t)$$

$$z_3(t+h) = z_3(t) + h\left(\frac{Gz_1(t) + \text{off} - Bz_3(t) - Kz_2(t)}{M}\right)$$

Runge-Kutta Integration (3rd Order Observer)

The classic Runge-Kutta technique is a 4th order one that provides accuracy of order $h^5$. Noting that (4) has the generic form $x_1 = f(x_1, x_3)$
$x_2 = m(x_3)$
$x_3 = g(x_1, x_2, x_3)$
we have $$z_{1,n+1} = z_{1,n} + \frac{1}{6}(k_1 + 2k_2 + 2k_3 + k_4)$$

$$k_1 = hf(z_{1,n}, z_{3,n})$$

$$k_2 = hf\left(z_{1,n} + \frac{k_1}{2}, z_{3,n} + \frac{r_1}{2}\right)$$

$$k_3 = hf\left(z_{1,n} + \frac{k_2}{2}, z_{3,n} + \frac{r_2}{2}\right)$$

$$k_4 = hf(z_{1,n} + k_3, z_{3,n} + r_3)$$

$$z_{2,n+1} = z_{2,n} + \frac{1}{6}(q_1 + 2q_2 + 2q_3 + q_4)$$

$$q_1 = hm(z_{3,n})$$

$$q_2 = hm\left(z_{3,n} + \frac{r_1}{2}\right)$$

-continued $$q_3 = hm\left(z_{3,n} + \frac{r_2}{2}\right)$$

$$q_4 = hm(z_{3,n} + r_3)$$

$$z_{3,n+1} = z_{3,n} + \frac{1}{6}(r_1 + 2r_2 + 2r_3 + r_4)$$

$$r_1 = hg(z_{1,n}, z_{2,n}, z_{3,n})$$

$$r_2 = hg\left(z_{1,n} + \frac{k_1}{2}, z_{2,n} + \frac{q_1}{2}, z_{3,n} + \frac{r_1}{2}\right)$$

$$r_3 = hg\left(z_{1,n} + \frac{k_2}{2}, z_{2,n} + \frac{q_2}{2}, z_{3,n} + \frac{r_2}{2}\right)$$

$$r_4 = hg(z_{1,n} + k_3, z_{2,n} + q_3, z_{3,n} + r_3)$$

The order of evaluation of the variables in this method is $z_{1,n}, z_{2,n}, z_{3,n},$
$k_1, q_1, r_1,$
$k_2, q_2, r_2,$
$k_3, q_3, r_3,$
$k_4, q_4, r_4,$
$z_{1,n+1}, z_{2,n+1}, z_{3,n+1}.$ Referring now to FIG. 9, a control system 300 is diagrammatically illustrated. A solenoid driver 305 is shown in electrical connection with the solenoid 100. Preferably the solenoid driver 305 produces a Pulse Width Modulation (PWM) driving signal having a predetermined frequency. The solenoid 100 includes a coil 110 and an armature 115 that is movable with respect to the coil 110. In one embodiment, the armature is linearly actuatable in response to the magnitude of current flowing in the coil 110, such as a linear solenoid. In an alternative embodiment, the armature is pivotally actuatable in response to the magnitude of current flowing in the coil 110, such as a rotary solenoid. As the armature moves, the size of the airgap between the coil and the armature changes dimensionally which causes the magnetic characteristics of the solenoid to change as described above.

A shunt resistor 310 is connected to and between the solenoid driver 305 and the solenoid 100. The magnitude of current flowing in the coil is determined by measuring the voltage across the shunt resistor 310 in a well known manner and is represented by block 315. The current circuit 315 produces a current signal that represents the magnitude of the current flowing in the coil. It may be desirable to filter the predetermined frequency of the PWM driving signal by an analog or digital filter. Moreover, it may be desirable to filter the driving signal in such a manner as not to introduce any phasic delay to the resulting current signal. The voltage across the first and second terminals 317,319 of the coil 110 is determined by a circuit represented by block 320. Accordingly, the voltage circuit 320 produces a voltage signal that represents the magnitude of the voltage across the coil.

The microprocessor 325 includes a predetermined amount of memory 330 that stores empirically determined data relating to the above-described $\lambda$, $\alpha$ and G terms, coil current magnitude, and armature position characteristics. The microprocessor 325 receives the coil current and voltage signal and responsively estimates the position and velocity of the armature 18 in accordance with equations described above.

It is to be recognized that FIG. 9 is a functional description and that a variety of different specific circuits for providing the features of the position detecting circuit could be designed by a person skilled in art.

The above discussion has been directed toward a solenoid model that is described as a third order system. However those skilled in the art may recognize that since the coil current is directly measured, it may desirable not to estimate the current. Thus, the solenoid model may described as a reduced order observer.

Industrial Applicability

With reference to the drawings and in operation, the present invention is adapted to indicate the position and velocity of an armature with respect to the coil of an electromagnetic actuator.

The control system 300 determines the magnitude of current flowing in the coil 115 and the magnitude of the voltage applied to the coil 115. In response to the magnitudes of the coil current and voltage, the control system 300 estimates the position and velocity of the armature 110 using the observer equations described above.

The positional and velocity information may be used for a number of control and diagnostic systems. For example, the estimated position may be used to provide feedback information for comparison with a desired position to modify the PWM duty cycle of the driving signal. Alternatively, the position information can be used to determine whether the armature is operating in a proper manner.

The observer model may be expanded to include hydraulic valve dynamics. Thus, in one application, the present invention may be used in conjunction with a transmission controller to monitor the position of a hydraulic spool to signal the occurrence of an end of fill condition of a hydraulic clutch. In another application, the present invention may be used to monitor the fuel rack position of an internal combustion engine. It will be recognizable, by those skilled in the art, that the present invention is suitable for a plurality of other applications.

Other aspects, objects, and advantages of this invention can be obtained from a study of the drawings, the disclosure, and the appended claims.

I claim:

1. An apparatus for determining the position of an armature of an electromagnetic actuator having a coil and a restoring spring, said armature being linearly movable relative to the coil in response to a current flowing in the coil, comprising:

means for measuring the magnitude of current in the coil and responsively producing a current signal;

means for measuring the magnitude of the voltage across the coil and responsively producing a voltage signal; and means for receiving the current and voltage signals, and responsively estimating predetermined state variables of the electromagnetic actuator according to the following equations:

$$\widetilde{x}_1 = \frac{V - R\widetilde{x}_1 - \alpha(\widetilde{x}_1,\widetilde{x}_2)\widetilde{x}_3}{\lambda(\widetilde{x}_1,\widetilde{x}_2)} + L_1(x_1 - \widetilde{x}_1)$$

$$\widetilde{x}_2 = \widetilde{x}_3 + L_2(x_1 - \widetilde{x}_1)$$

$$\widetilde{x}_3 = \frac{G}{M}\widetilde{x}_1 + \frac{\text{off}}{M} - \frac{K}{M}\widetilde{x}_2 - \frac{B}{M}\widetilde{x}_3 + L_3(x_1 - \widetilde{x}_1)$$

where:

$\lambda = \partial\psi/\partial I$;

$\alpha = \partial\psi/\partial y$;

$\psi$ is the coil flux linkage;

I is the coil current;

y is the armature position;

$x_1 = I$;

V is the coil voltage;

R is the coil resistance;

F is the actuator electromechanical force;

M is armature mass;

B is the friction force coefficient;

K is the spring stiffness;

$L_1$, $L_2$, $L_3$ are the gain values;

G, offset are the coupling parameters relating F and I;

$\widetilde{x}_1$ is the estimated coil current;

$\widetilde{x}_2$ is the estimated armature position; and $\widetilde{x}_3$ is the estimated armature velocity.

2. An apparatus, as set forth in claim 1, wherein the values of $\lambda$, $\alpha$ and G are dynamically related to the measured current and estimated position values.

3. An apparatus, as set forth in claim 2, wherein the estimating means includes a memory means for storing a plurality of $\lambda$, $\alpha$ and G values that correspond to a plurality of measured current and estimated position values, and selecting respective ones of the plurality of stored $\lambda$, $\alpha$ and G values in response to the measured current signal and estimated position values.

4. An apparatus, as set forth in claim 2, wherein the estimating means includes means for storing equations representing the $\lambda$, $\alpha$ and G values, and calculating the $\lambda$, $\alpha$ and G values in response to the measured current signal and estimated position values.

5. An apparatus, as set forth in claim 3, including means for comparing an estimated position value with a desired position value, and responsively modifying the current applied to the coil.

6. A method for determining the position of an armature of an electromagnetic actuator having a coil and a restoring spring, said armature being linearly movable in response to a current flowing in the coil, the method including the steps of:

measuring the magnitude of current in the coil and responsively producing a current signal;

measuring the magnitude of the voltage across the coil and responsively producing a voltage signal; and receiving the current and voltage signals, and responsively estimating predetermined state variables of the electromagnetic actuator according to the following equations:

$$\widetilde{x}_1 = \frac{V - R\widetilde{x}_1 - \alpha(\widetilde{x}_1,\widetilde{x}_2)\widetilde{x}_3}{\lambda(\widetilde{x}_1,\widetilde{x}_2)} + L_1(x_1 - \widetilde{x}_1)$$

$$\widetilde{x}_2 = \widetilde{x}_3 + L_2(x_1 - \widetilde{x}_1)$$

$$\widetilde{x}_3 = \frac{G}{M}\widetilde{x}_1 + \frac{\text{off}}{M} - \frac{K}{M}\widetilde{x}_2 - \frac{B}{M}\widetilde{x}_3 + L_3(x_1 - \widetilde{x}_1)$$

where:

$\lambda = \partial\psi/\partial I$;

$\alpha = \partial\psi/\partial y$;

$\psi$ is the coil flux linkage;
I is the coil current;
y is the armature position;
$x_1 = I$;
V is the coil voltage;
R is the coil resistance;
F is the actuator electromechanical force;
M is armature mass;
B is the friction force coefficient;
K is the spring stiffness;
$L_1, L_2, L_3$ are the gain values;
G,offset are the coupling parameters relating F and I;
$x_1$ is the estimated coil current;
$x_2$ is the estimated armature position; and
$x_3$ is the estimated armature velocity.

7. An apparatus, as set forth in claim 6, wherein the $\lambda$, $\alpha$ and G values are dynamically related to the measured current and estimated position.

* * * * *